United States Patent [19]
Vollin et al.

[11] Patent Number: 5,373,432
[45] Date of Patent: Dec. 13, 1994

[54] FIXED FREQUENCY DC TO DC CONVERTER WITH A VARIABLE INDUCTANCE CONTROLLER

[75] Inventors: Jeffrey L. Vollin, West Hills; Dong Tan, Pasadena, both of Calif.

[73] Assignee: Hughes Aircraft Company, Los Angeles, Calif.

[21] Appl. No.: 988,522

[22] Filed: Dec. 10, 1992

[51] Int. Cl.$^5$ ............................................. H02M 3/335
[52] U.S. Cl. ........................................ 363/16; 363/17; 363/20
[58] Field of Search ............................ 363/16, 17, 20; H02M 3/335

[56] References Cited

U.S. PATENT DOCUMENTS

| | | | |
|---|---|---|---|
| 4,563,731 | 1/1986 | Sato et al. | 363/17 |
| 4,930,063 | 5/1990 | Henze et al. | 363/91 |
| 4,992,919 | 2/1991 | Lee et al. | 363/17 |
| 5,065,301 | 11/1991 | Shioya et al. | 363/17 |
| 5,159,541 | 10/1992 | Jain | 363/26 |

OTHER PUBLICATIONS

"Class E Resonant Regulated DC/DC Power Converters: Analysis of Operations, and Experimental Results at 1.5 MHz," R. Redl, B. Molnar, N. Sokal, IEEE Transactions on Power Electronics, vol. PE-1, No. 4, pp. 111–120, Apr. 1986.

"Class E–A New Class of High-Efficiency Tuned Single-Ended Switching Power Amplifiers," N. O. Sokal, A. D. Sokal, IEEE Journal of Solid–State Circuits, vol. SC–10, No. 3, Jun. 1975.

Primary Examiner—Jeffrey L. Sterrett
Attorney, Agent, or Firm—Randall M. Heald; Charles D. Brown; Wanda K. Denson-Low

[57] ABSTRACT

A DC to DC converter (50, 60, 70) that includes a switching circuit (10) responsive to a DC input, a magnetic amplifier controller (20) responsive to the switching circuit for providing an AC output, and an AC current to DC voltage rectifying circuit (30) responsive to the output of the magnetic amplifier controller for providing a DC output voltage. The magnetic amplifier controller includes a variable inductance (L1) that cooperates with the switching circuit to form a resonant DC to AC inverter (110) that provides to the magnetic amplifier controller a current whose amplitude is controlled by the variable inductance. The magnetic amplifier controller provides an approximately sinusoidal output current which is a function of the current input thereto, and the DC voltage output of the AC current to DC voltage rectifier is a proportional to the input current provided by the magnetic amplifier controller. Thus, the DC voltage output of the DC to DC converter is controlled by the control current to the magnetic amplifier controller.

4 Claims, 5 Drawing Sheets

FIXED FREQUENCY DC TO DC CONVERTER WITH A VARIABLE INDUCTANCE CONTROLLER

BACKGROUND OF THE INVENTION

The subject invention is directed generally to DC to DC converters, and more particularly to an improved DC to DC converter that utilizes a fixed switching frequency and employs a non-saturating magnetic amplifier controller to control the voltage of the converter.

DC to DC converters are utilized in applications wherein the output of a source DC voltage needs to be converted to a DC supply voltage of a different voltage level. Typically, the source DC voltage is converted to an AC voltage by some form of switching circuitry. The AC voltage is stepped up or down as required, and then rectified to provide the DC supply voltage. For reasons associated with switching loss and noise generation it is often desirable to utilize approximately sinusoidal waveforms for the AC portion of a DC to DC converter, and the DC to DC converters disclosed herein utilize approximately sinusoidal waveforms in their respective AC portions.

The output voltage of a switching DC to DC converter that utilizes approximately sinusoidal waveforms in its AC portion is typically controlled by varying switching frequency. A consideration with varying switching frequency for voltage regulation is that many devices that may be used as a load on the rectifier circuit of a DC to DC converter are very sensitive to ripple out of the rectifier circuit. To alleviate noise sensitivity, special techniques are used to filter out ripple, but such techniques require ripple to be at a fixed frequency and thus are not suitable for use with DC to DC converters that vary frequency to achieve output voltage control.

SUMMARY OF THE INVENTION

It would therefore be an advantage to provide a DC to DC converter that provides for output voltage regulation without varying switching frequency.

The foregoing and other advantages are provided by the invention in a DC to DC converter that includes switching circuitry responsive to DC power and driven at a fixed frequency for providing a switched power signal, a magnetic amplifier controller having a variable inductance and cooperating with the switching circuitry to form a controlled current source having a resonant switching circuit that includes the variable inductance and whose current output is provided by the magnetic amplifier controller and is an approximately sinusoidal AC current that is a function of the variable inductance, an AC current to DC voltage rectifier responsive to the AC current output of the magnetic amplifier controller for providing a DC output voltage that is proportional to the AC output of the magnetic amplifier controller, and a control circuit for controlling the magnetic amplifier controller to control the variable inductance and thereby control the DC output voltage of the rectifier circuit.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
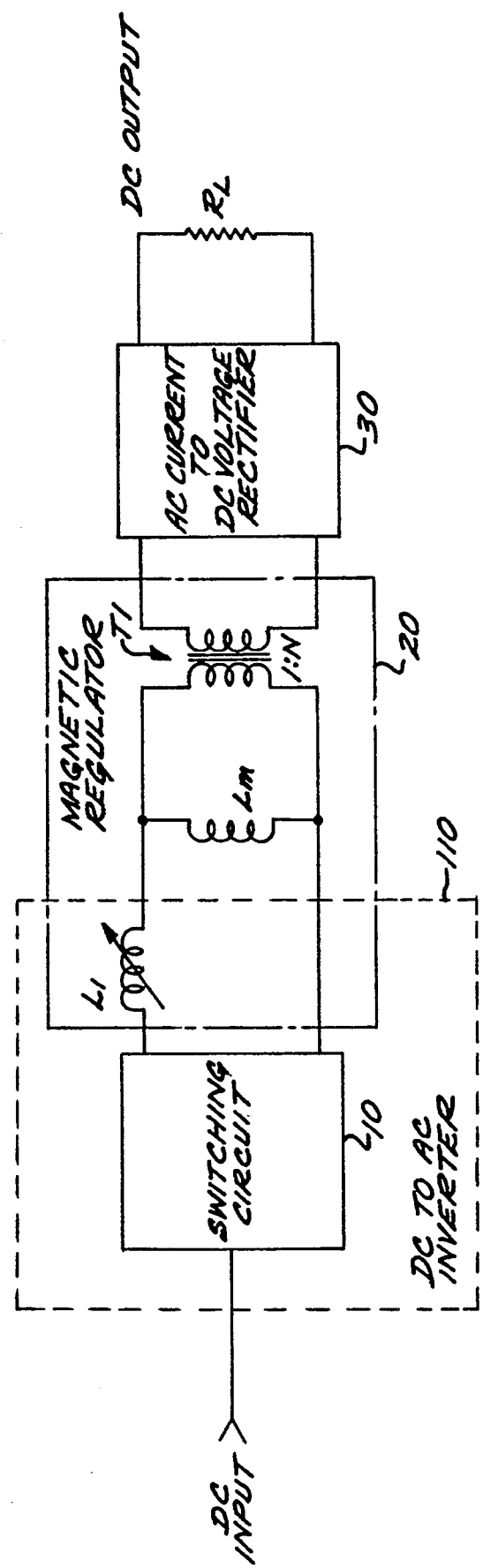
FIG. 1 is a schematic block diagram of a DC to DC converter in accordance with the invention.

In the following detailed description and in the several figures of the drawing, like elements are identified with like reference numerals.

Referring now to FIG. 1, set forth therein is a simplified block diagram of a DC to DC converter in accordance with the invention. The DC to DC converter generally includes a switching circuit 10 that is responsive to a DC voltage for providing a switched power signal, a magnetic amplifier controller 20 (shown in the form of a simplified equivalent circuit) responsive to the switching circuit 10 for providing an approximately sinusoidal AC current to an AC current to DC voltage rectifier circuit 30 which rectifies the AC current output of the magnetic amplifier controller and provides a DC output voltage for a load identified as $R_L$. The switching circuit 10 includes elements that form a resonant DC to AC inverter 110 except for a variable inductance L1 that is provided by the magnetic amplifier controller 20. The switching circuit 10 and the variable inductance L1 form a DC to AC inverter 110 that converts a DC voltage to an approximately sinusoidal AC current which passes through a tuned LC circuit comprised of the inductance L1 provided by the magnetic amplifier controller 20 and a capacitor in the switching circuit 10. Effectively, the switching circuit 10 and the magnetic amplifier controller comprise a controlled current source whose approximately sinusoidal current output, which is provided to the AC current to DC voltage rectifier 30, is controlled by the magnetic amplifier controller 20 which in turn is controlled by a control current as described further herein.

In operation, the control current to the magnetic amplifier controller controls the tuned circuit inductance L1 which controls the impedance of the tuned LC circuit. The impedance of the tuned LC circuit controls the flow of current into the magnetic amplifier controller 20 from the switching circuit 10, and the output current of the magnetic amplifier controller 20 is a function of the current flow at its input. The voltage output of the AC current to DC voltage rectifier is proportional to the input current received from the magnetic amplifier controller, and thus the DC voltage output provided by the AC current to DC voltage rectifier 30 is controlled as a function of the control current to the magnetic amplifier controller.

In addition to providing the inductance L1 for the resonant DC to AC inverter 110, the magnetic amplifier controller can be designed to implement a fixed inductance Lm that is useful in implementing the AC current to DC voltage rectifier. In those implementations where the inductance Lm is not desired, its value can be designed to be sufficiently high so as not to affect the circuit.

The simplified equivalent circuit of the magnetic amplifier controller 20 as shown in FIG. 1 more particularly includes the variable inductance L1 and the fixed inductance Lm which are serially connected across the input to the magnetic amplifier controller 20. The primary winding of a 1:N turn transformer T1 is connected across the fixed inductance Lm, while the terminals of the secondary winding of the transformer provide the output of the magnetic amplifier controller. As described further herein, the inductance of the variable inductance L1 is varied by a control current which therefore controls the DC output voltage.

Figure 2:
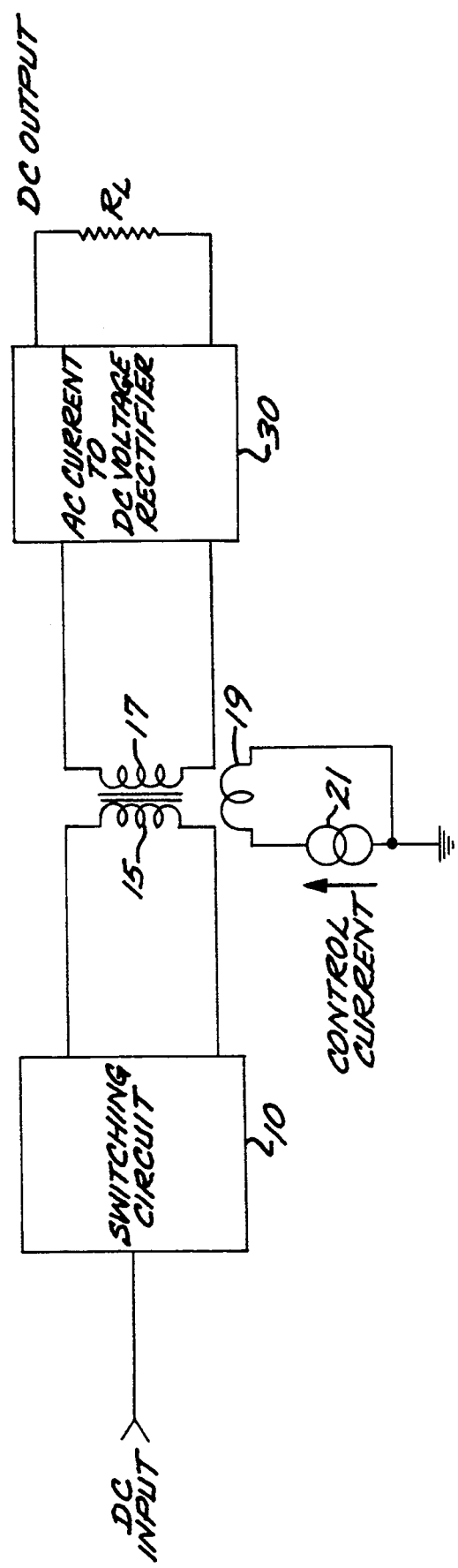
FIG. 2 is a symbolic circuit diagram of the magnetic amplifier controller of the DC to DC converter of FIG. 1 and a controlling current source therefor.

Referring now to FIG. 2, set forth therein is a block diagram similar to that of FIG. 1 and which includes a symbolic circuit schematic of the magnetic amplifier controller 20 of the DC to DC converter of FIG. 1. The magnetic amplifier controller 20 includes a primary winding 15 which receives the input to the magnetic amplifier controller, a secondary winding 17 that provides the output of the magnetic amplifier controller, and a control winding 19 which is driven by a control current source 21 for controlling the magnetic amplifier controller. Variation of the control current provided to the control winding 19 changes the inductance L1 of the equivalent circuit of the magnetic amplifier controller. An example of a magnetic amplifier controller that can be utilized in the DC to DC converter of the invention is disclosed in commonly assigned copending U.S. application Ser. No. 07/977,363, filed Nov. 17, 1992, by Vollin and Tan, entitled "IMPROVEMENT TO NON-SATURATING MAGNETIC AMPLIFIER CONTROLLER," Attorney Docket No. PD 92073, incorporated herein by reference.

Figure 3:
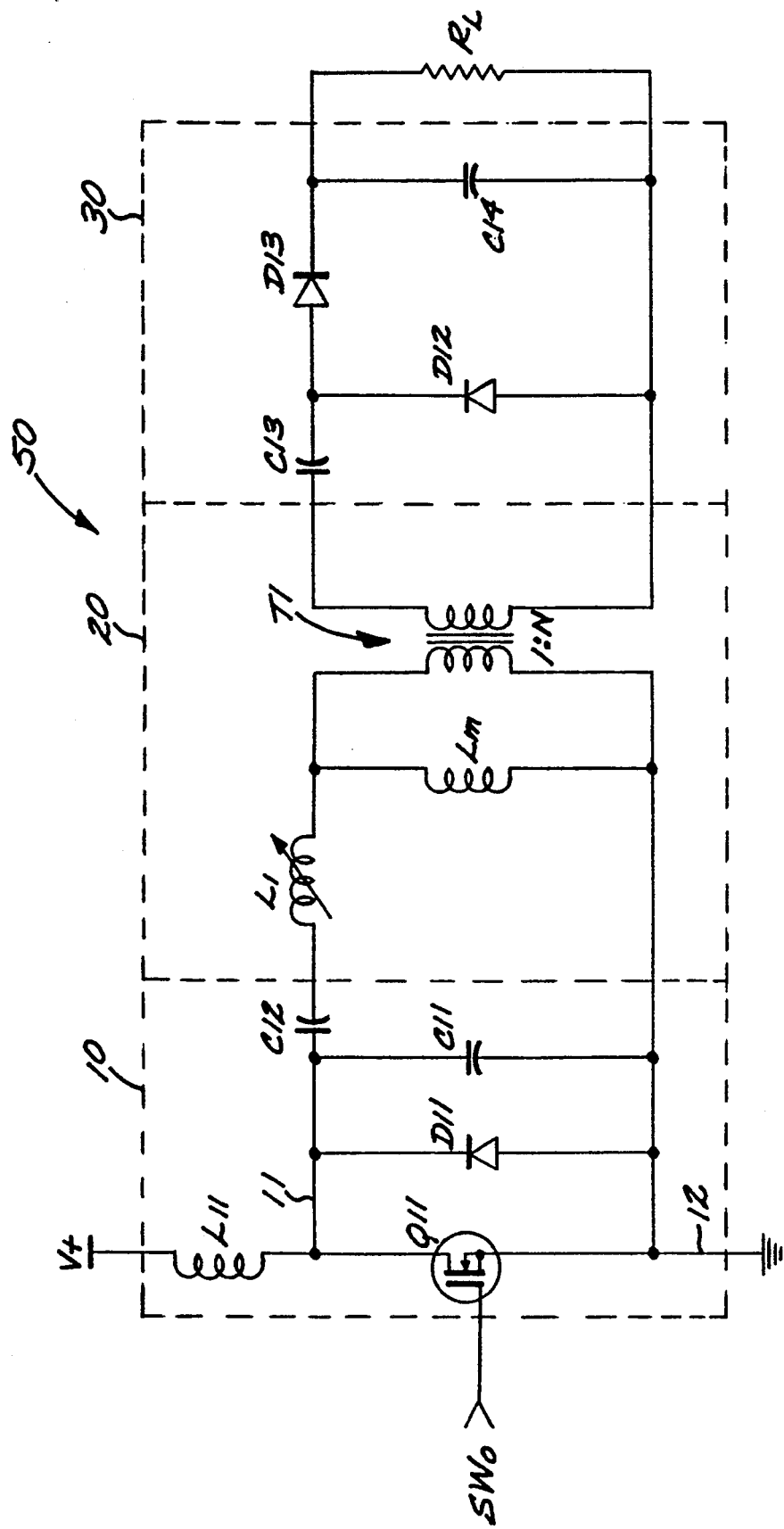
FIG. 3 sets forth by way of illustrative example a circuit schematic of an implementation of a DC to DC converter in accordance with the invention.

Referring now to FIG. 3, set forth therein is an implementation of a DC to DC converter 50 in accordance with the invention wherein the inverter formed by the switching circuit 10 and the variable inductor L1 comprises a Class-E circuit and wherein the AC current to DC voltage rectifier circuit 30 comprises a voltage doubler circuit. The switching circuit 10 of the DC to DC converter of FIG. 3 includes a feed choke inductor L11 which is connected between a DC supply voltage V+ and a node 11. The drain of a power FET Q11 is connected to the node 11, while its source is connected to an input ground node 12. The gate of the power FET Q1 is driven by a fixed frequency square wave signal $SW_o$ having a fixed frequency of at least about 100 KHz which allows for smaller components in general. A diode D11 is connected between the node 11 and the input ground node 12, with its anode connected to the input ground node 12 and its cathode connected to the node 11. A capacitor C11 is connected between the node 11 and the ground node 12, and a capacitor C12 is connected between the node 11 and the non-grounded input of the magnetic amplifier that is connected to the variable inductance L1 of the amplifier controller 20. The other input terminal of the magnetic amplifier controller is connected to the ground node 12.

The AC current to DC voltage rectifier circuit 30 of the DC to DC converter of FIG. 3 includes a capacitor C13 connected between one output terminal of the magnetic amplifier controller and the cathode of a diode D12 which has its anode connected to the other terminal of the magnetic amplifier controller 20. A diode D13 has its anode connected to the cathode of the diode D12, and a filter capacitor C14 is connected between the cathode of the diode D13 and the anode of the diode D12. A load $R_L$ is connected in parallel across the filter capacitor C14.

The variable inductance L1 provided by the magnetic amplifier controller 20 and the components of the switching circuit 10 function as a Class-E resonant inverter that includes a series resonant circuit comprised of the variable inductance L1 and the capacitor C12 which provides an approximately sinusoidal AC current whose amplitude is controlled by the control current provided to the magnetic amplifier controller 20. The inductance Lm provided by the magnetic amplifier controller functions as an impedance matching and waveform shaping inductance for the input to the AC current to DC voltage rectifier circuit 30; and the magnetic amplifier controller 20 additionally functions as a transformer which provides for input to output DC isolation and voltage step-up or step down. The waveform shaping function of the inductance Lm can be further understood by considering the pertinent waveforms of signals in the circuit of FIG. 1. The current in the variable inductor L1 is approximately sinusoidal, and the current in the fixed inductance Lm is a triangular wave in response to the voltage waveform impressed across the variable inductor L1 in accordance with the behavior of the AC current to DC voltage rectifier 30. The current into the rectifier 30 is the difference between the sine wave current in the variable inductance L1 and the triangular wave current in the fixed inductance Lm, and thus has a skewed approximately sinusoidal waveform that rises slowly at the start of the current conduction cycle and then rises to a peak prior to the end of the cycle. Such a current waveform has the desirable effect of slowly turning on the diodes in the AC current to DC voltage rectifier 30 which reduces the diode losses caused by reverse recovery. Diode current waveform shaping as described in the foregoing is discussed in detail in "Class E Resonant Regulated DC/DC Power Converters: Analysis of Operations, and Experimental Results at 1.5 MHz, " *IEEE Transactions on Power Electronics*, Vol. PE-1, No. 4, pp. 111-120, April 1986, incorporated herein by reference.

In operation, the DC output voltage provided by the DC to DC converter 50 to the load $R_L$ is controlled by the control current for the magnetic amplifier controller since (a) the inductance of the variable inductor L1 is controlled by the control current, (b) the impedance of the series resonant circuit comprised of the variable inductance L1 and the capacitor C12 is controlled by the inductance of the variable inductance L1, (c) the flow of current into the magnetic amplifier controller is controlled by impedance of the series resonant circuit comprised of the variable inductance L1 and the capacitor C12, (d) the current output of the magnetic amplifier controller provided to the AC current to DC voltage rectifier circuit is a function of the input current thereto, and (e) the DC output voltage of the AC current to DC voltage rectifier is proportional to its input current.

Figure 4:
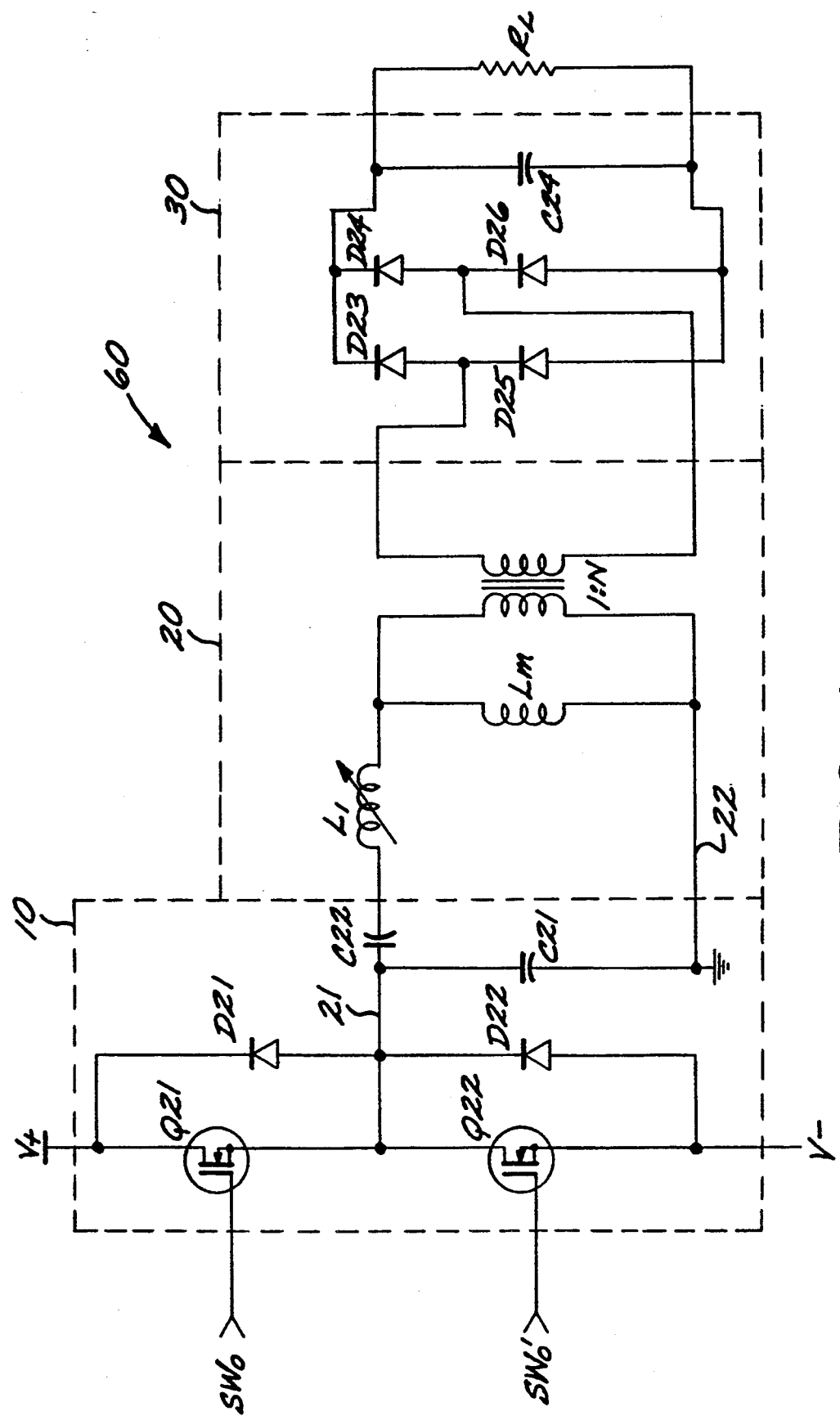
FIG. 4 sets forth by way of illustrative example a circuit schematic of a further implementation of a DC to DC converter in accordance with the invention.

Referring now to FIG. 4, set forth therein is an implementation of a DC to DC converter 60 in accordance with the invention wherein the DC to AC inverter formed by the switching circuit 10 and the variable inductor L1 comprises a push-pull inverter circuit and the AC current to DC voltage rectifier circuit 30 comprises a bridge rectifier circuit. The switching circuit 10 of the DC to DC converter of FIG. 4 includes first and second serially connected power FETs Q21, Q22, wherein the power FET Q21 has its drain connected to a DC positive supply voltage V+ and its source connected at a node 21 to the drain of the power FET Q22 which has its source connected a DC negative supply voltage V−. The gates of the power FETs Q21, Q22 are driven by respective fixed frequency square wave signals $SW_o$, $SW_o'$ which are 180 degrees out of phase with each other and which have the same fixed frequency that is at least about 100 KHz which allows for smaller components in general. Each of the fixed frequency square wave signals has a switching period of T and is at the active level for an interval of T/4, for example at the start of each respective switching period. Thus, when one of the FETs Q21, Q22 is on for an interval of T/4, the other is off, and both are off for an interval of T/4 before the other FET is turned on. In other words, the active states of the square wave signals are interleaved and separated relative to each other by intervals of T/4. Within each of the square wave signals, the active levels are separated by intervals of 3T/4.

A diode D21 is connected across the FET Q21, with its anode connected to the node 21 and its cathode connected to the positive supply voltage V+. A diode D22 is connected across the power FET Q22, with its anode connected to the negative supply voltage V− and its cathode connected to the node 21. A capacitor C21 is connected between the node 21 and an input ground node 22, while a capacitor C22 is connected between the node 21 and the input terminal of the magnetic amplifier controller 20 that is connected to the variable inductance L1 of the amplifier controller 20. The other input terminal of the magnetic amplifier controller is connected to the ground node 22.

The AC current to DC voltage rectifier circuit 30 of the DC to DC converter 60 of FIG. 4 includes serially connected diodes D23, D25 connected in parallel with serially connected diodes D24, D26, wherein the anode of the diode D23 is connected to the cathode of the diode D25, and wherein the anode of the diode D24 is connected to the cathode of the diode D26. One secondary winding terminal of the magnetic amplifier controller 20 is connected to the node between the serially connected diodes D23, D25, while the other secondary winding terminal of the magnetic amplifier controller 20 is connected to the node between the serially connected diodes D24, D26. A filter capacitor C24 is connected in parallel across the serially connected diode pairs D23, D25 and D24, D26; and an output load $R_L$ is connected across the filter capacitor C24.

The variable inductance L1 provided by the magnetic amplifier controller 20 and the components of the switching circuit 10 of FIG. 4 function as a resonant inverter that includes a series resonant circuit comprised of the variable inductance L1 and the capacitor C22 which provides an approximately sinusoidal AC current whose amplitude is controlled by the control current provided to the magnetic amplifier controller 20. The resonant inverter of FIG. 4 functions similarly to the Class-E inverter of FIG. 3, except that a push-pull switch configuration is used in the inverter of FIG. 4. Persons skilled in the art will recognize that the inverter of FIG. 4 has the zero-voltage-switching characteristic of a Class-E circuit, but is voltage-fed thus making it distinct from the conventional Class-E inverter. The equivalent circuit inductance Lm provided by the magnetic amplifier controller 20 functions as an impedance matching and current waveform shaping inductance for the input to the AC voltage to DC voltage rectifier circuit 30; and the magnetic amplifier controller 20 functions as a transformer which additionally provides for input to output DC isolation and voltage step-up or step down.

In operation, the DC output voltage provided by the DC to DC converter 60 to the load $R_L$ is controlled by the control current for the magnetic amplifier controller since (a) the inductance of the variable inductor L1 is controlled by the control current, (b) the impedance of the series resonant circuit comprised of the variable inductance L1 and the capacitor C22 is controlled by the inductance of the variable inductance L1, (c) the flow of current into the magnetic amplifier controller is controlled by impedance of the series resonant circuit comprised of the variable inductance L1 and the capacitor C22, (d) the current output of the magnetic amplifier controller provided to the AC current to DC voltage rectifier circuit is a function of the input current thereto, and (e) the DC output voltage of the AC current to DC voltage rectifier is proportional to its input current.

Figure 5:
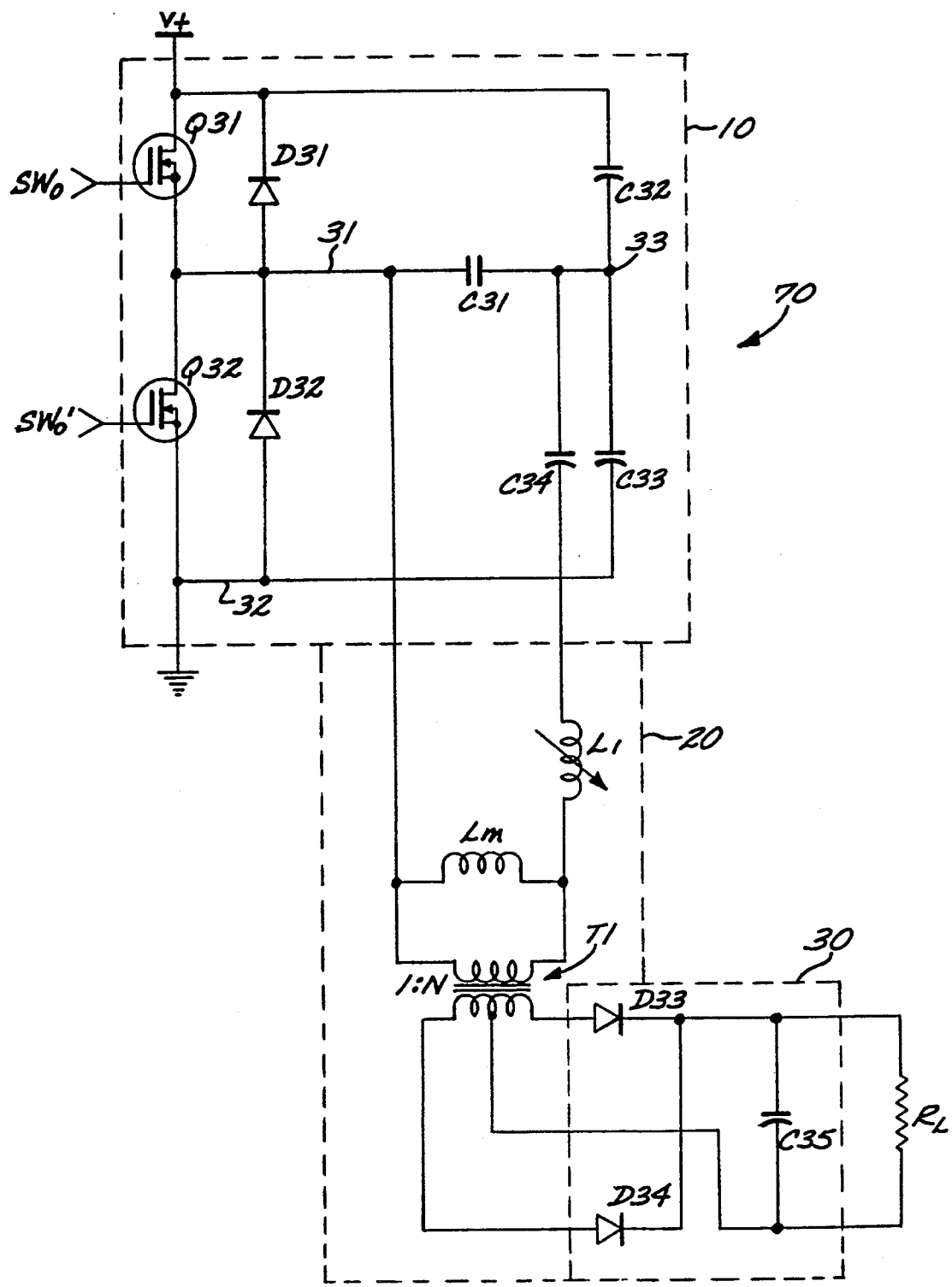
FIG. 5 sets forth by way of illustrative example a circuit schematic of another implementation of a DC to DC converter in accordance with the invention.

Referring now to FIG. 5, set forth therein is an implementation of a DC to DC converter 70 in accordance with the invention wherein the DC to AC inverter comprises a half-bridge circuit with zero-voltage-switching and the AC current to DC voltage rectifier circuit comprises a full-wave rectifier circuit. The switching circuit 10 of the DC to DC converter of FIG. 5 includes first and second serially connected power FETs Q31, Q32, wherein the power FET Q31 has its drain connected to a DC supply voltage V+ and its source connected at a node 31 to the drain of the power FET Q32 which has its source connected to an input ground node 32. The gates of the power FETs Q31, Q32 are driven by respective fixed frequency square wave signals $SW_o$, $SW_o'$ in the same manner as the power FETs Q21, Q22 of the DC to DC converter of FIG. 4. The square wave signals $SW_o$, $SW_o'$ are 180 degrees out of phase with each other and have the same fixed frequency that is at least about 100 KHz which allows for smaller components in general. Each of the fixed frequency square wave signals has a switching period of T and is at the active level for an interval of T/4, for example at the start of each respective switching period. Thus, when one of the FETs Q31, Q32 is on of an interval of T/4, the other is off, and both are off for an interval of T/4 before the other FET is turned on. In other words, the active states of the square wave signals are interleaved and separated by intervals of T/4. Within each of the square wave signals, the active levels are separated by intervals of 3T/4.

A diode D31 is connected across the FET Q31, with its anode connected to the node 31 and its cathode connected to the supply voltage V+. A diode D32 is connected across the power FET Q32, with its anode connected to the input ground node 32 and its cathode connected to the node 31. Capacitors C32, C33 are connected in series across the serially connected diodes D31, D32, and a capacitor C31 is between the node 31 and a node 33 that is between the capacitors C32, C33. A capacitor C34 is connected between the node 33 and the terminal of the magnetic amplifier controller 20 that is connected to the variable inductance L1. The other terminal of the magnetic amplifier controller is connected to the node 31.

The AC current to DC voltage rectifier circuit of the DC to DC converter of FIG. 5 includes diodes D33, D34 whose anodes are respectively connected to the secondary winding terminals of the magnetic amplifier controller 20 and whose cathodes are connected together. A filter capacitor C35 is connected between a center tap of the secondary winding of the magnetic amplifier controller and the commonly connected cathodes of the diodes D33, D34. An output load $R_L$ is connected across the filter capacitor C35.

The variable inductance L1 provided by the magnetic amplifier controller 20 and the switching circuit 10 of FIG. 5 function as a resonant inverter that includes a series resonant circuit comprised of the variable inductance L1 and the capacitor C34 which provides an AC current whose amplitude is controlled by the control current provided to the magnetic amplifier controller 20. The inductance Lm provided by the magnetic amplifier controller 20 functions as an impedance matching and current waveform shaping inductance for the input to the AC current to DC voltage rectifier circuit 30; and the magnetic amplifier controller 20 additionally functions as a transformer which provides for input to output DC isolation and voltage step-up or step down.

In operation, the DC output voltage provided by the DC to DC converter 70 to the load $R_L$ is controlled by the control current for the magnetic amplifier controller since (a) the inductance of the variable inductor L1 is controlled by the control current, (b) the impedance of the series resonant circuit comprised of the variable inductance L1 and the capacitor C34 is controlled by the inductance of the variable inductance L1, (c) the flow of current into the magnetic amplifier controller is controlled by impedance of the series resonant circuit comprised of the variable inductance L1 and the capacitor C34, (d) the current output of the magnetic amplifier controller provided to the AC current to DC voltage rectifier circuit is a function of the input current thereto, and (e) the DC output voltage of the AC current to DC voltage rectifier is proportional to its input current.

In a DC to DC converter in accordance with the invention, as exemplified by the circuits of FIGS. 3-5, the DC output voltage provided by the AC current to DC voltage rectifier circuit 30 is controlled by the control current provided to the magnetic amplifier controller. Thus, by using feedback to compare the DC output voltage against a reference, a DC to DC converter in accordance with the invention can be utilized as the power processing stage in a regulated DC to DC power supply.

The foregoing has been a disclosure of a switching DC to DC converter that utilizes an approximately sinusoidal fixed frequency current to drive an AC current to DC voltage rectifier circuit, which results in output ripple on the DC output power that is at a fixed frequency and reduced losses in the rectifier circuit diodes, and is suitable for loads which cannot tolerate switching frequency variation. The DC to DC converter of the invention includes a magnetic amplifier controller that advantageously provides (a) a variable resonant inductance of the converter that enables fixed-frequency regulation of the DC output voltage, (b) a transformer that provides for input to output DC isolation and voltage step-up or step-down, and (c) an impedance matching and current waveform shaping inductance if desired for the particular application, whereby the number of magnetic components is reduced as a result of efficient utilization of the inductances and the transformer provided by the magnetic amplifier controller. As a result of the relatively high AC operating frequency and the integration provided by the magnetic amplifier controller, a DC to DC converter in accordance with the invention can be compact and of light weight.

Although the foregoing has been a description and illustration of specific embodiments of the invention, various modifications and changes thereto can be made by persons skilled in the art without departing from the scope and spirit of the invention as defined by the following claims.

What is claimed is:

1. A DC to DC converter comprising:
   switching means responsive to DC power and driven at a fixed frequency for providing a switched power signal, said switching means including components of a resonant switching circuit except for an inductor;
   magnetic amplifier controller means having a primary winding a secondary winding, and variable inductance in series with said primary winding, said variable inductance cooperating with said switching means such that the variable inductance and said switching means form a resonant switching circuit, said magnetic amplifier controller means providing an approximately sinusoidal AC output that is a function of the variable inductance;
   rectifying means responsive to the AC output of said magnetic amplifier controller means for providing a DC output voltage that is proportional to the AC output of said magnetic amplifier controller means; and
   control means for controlling said magnetic amplifier controller means to control said variable inductance and thereby control said DC output voltage.

2. The DC to DC converter of claim 1 wherein said magnetic amplifier controller further includes a fixed inductance across said primary winding, said fixed inductance functioning as an impedance matching and current waveform shaping inductance for the input to said rectifying means.

3. A DC to DC converter comprising:
   switching means responsive to DC power and driven at a fixed frequency for providing a switched power signal, said switching means including components of a resonant switching circuit except for an inductor;
   magnetic amplifier controller means having a primary winding and a secondary winding, and a variable inductance in series with said primary winding, said variable inductance cooperating with said switching means to form a controlled current source wherein the variable inductance and said switching means form a resonant switching circuit, said magnetic amplifier controller means providing an approximately sinusoidal AC current output that is a function of the variable inductance;
   AC current to DC voltage rectifying means responsive to the AC current output of said magnetic amplifier controller means for providing a DC output voltage that is proportional to the AC current output of said magnetic amplifier controller means; and
   control means for controlling said magnetic amplifier controller means to control said variable inductance and thereby control said DC output voltage.

4. The DC to DC converter of claim 3 wherein said magnetic amplifier controller further includes a fixed inductance across said primary winding, said fixed inductance functioning as an impedance matching and current waveform shaping inductance for the input to said AC current to DC voltage rectifying means.

* * * * *